United States Patent
Ota et al.

(10) Patent No.: US 12,037,192 B2
(45) Date of Patent: Jul. 16, 2024

(54) TRANSPORT SYSTEM AND TRANSPORT METHOD

(71) Applicant: TOYOTA JIDOSHA KABUSHIKI KAISHA, Toyota (JP)

(72) Inventors: Junya Ota, Tokyo (JP); Kunihiro Iwamoto, Nagakute (JP); Yuta Itozawa, Nagoya (JP); Hirotaka Komura, Tokyo (JP); Yutaro Takagi, Tokyo (JP); Yoshiaki Nakamoto, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 289 days.

(21) Appl. No.: 17/650,540

(22) Filed: Feb. 10, 2022

(65) Prior Publication Data
US 2022/0274777 A1  Sep. 1, 2022

(30) Foreign Application Priority Data
Feb. 16, 2021 (JP) ................. 2021-022713

(51) Int. Cl.
*B65G 1/06* (2006.01)
*B25J 5/00* (2006.01)
*B65G 1/04* (2006.01)

(52) U.S. Cl.
CPC ............. *B65G 1/065* (2013.01); *B25J 5/007* (2013.01); *B65G 1/0492* (2013.01)

(58) Field of Classification Search
CPC ........ B65G 1/065; B65G 1/0492; B65G 1/06; B25J 5/007

USPC ....................................................... 198/346.3
See application file for complete search history.

(56) References Cited

U.S. PATENT DOCUMENTS 10,800,617 B2 * 10/2020 Ueda .................... B65G 61/00
2021/0032031 A1 * 2/2021 Kalouche ............. B25J 19/0025

FOREIGN PATENT DOCUMENTS

| CN | 104003089 A | 8/2014 |
| CN | 107985885 A | 5/2018 |
| JP | H07196143 A | 8/1995 |
| JP | 2001341809 A | 12/2001 |
| JP | 2009263055 A | 11/2009 |

OTHER PUBLICATIONS

JP H07196143 to A (Year: 1995), Aug. 1995.*
JP 2004277062A (Year: 2004), Oct. 2004.*
DE 102018129886 (Year: 2018), May 2020.*

* cited by examiner

Primary Examiner — Gene O Crawford
Assistant Examiner — Lester Rushin, III
(74) Attorney, Agent, or Firm — Dickinson Wright, PLLC

(57) ABSTRACT

A rack includes a pair of first rail portions extending in a depth direction for supporting protrusions, a pair of first gradient portions inclining downward toward a front surface of the rack, a pair of second rail portions facing the pair of the first rail portions, and a pair of second gradient portions inclining upward toward the front surface of the rack. A transport robot includes a top plate on which an object is placed, an elevating portion that raises and lowers the top plate, one or more load sensors provided on the top plate, and a control unit for controlling the elevating portion based on measurement results.

5 Claims, 13 Drawing Sheets

TRANSPORT SYSTEM AND TRANSPORT METHOD

CROSS-REFERENCE TO RELATED APPLICATION

This application claims priority to Japanese Patent Application No. 2021-022713 filed on Feb. 16, 2021, incorporated herein by reference in its entirety.

BACKGROUND

1. Technical Field

The present disclosure relates to a transport system and a transport method.

2. Description of Related Art

Japanese Unexamined Patent Application Publication No. 2001-341809 (JP 2001-341809 A) discloses a device in which an article is placed on an elevating table, transported, and transferred to a rack. The device described in JP 2001-341809 A adjusts the height of the elevating table when the device is transferred to the rack.

SUMMARY

The rack may be equipped with guide rails to support an object. In such a case, there is an issue that it is difficult to adjust the height of the object to the position of the guide rails due to equipment variations.

The present disclosure has been made to solve such an issue, and an object thereof is to provide a transport system and a transport method that facilitate adjusting the height of an object to the position of guide rails provided on a rack.

A transport system in the present embodiment is a transport system in which an object is stored in a rack by a transport robot. The object includes protrusions protruding outward in a width direction. The rack includes a pair of first rail portions extending in a depth direction for supporting the protrusions, a pair of first gradient portions extending from ends of the pair of the first rail portions and inclining downward toward a front surface of the rack, a pair of second rail portions provided above the pair of the first rail portions so as to face the pair of the first rail portions, and a pair of second gradient portions extending from ends of the pair of the second rail portions and inclining upward toward the front surface of the rack. The transport robot includes a top plate on which the object is placed, an elevating portion that raises and lowers the top plate, one or more load sensors provided on the top plate, and a controller for controlling the elevating portion based on measurement results of each of the one or more load sensors.

A transport method in the present embodiment is a transport method in which an object is stored in a rack by a transport robot. The object includes protrusions protruding outward in a width direction. The rack includes a pair of first rail portions extending in a depth direction for supporting the protrusions, a pair of first gradient portions extending from ends of the pair of the first rail portions and inclining downward toward a front surface of the rack, a pair of second rail portions provided above the pair of the first rail portions so as to face the pair of the first rail portions, and a pair of second gradient portions extending from ends of the pair of the second rail portions and inclining upward toward the front surface of the rack. The transport robot includes a top plate on which the object is placed, an elevating portion that raises and lowers the top plate, and one or more load sensors provided on the top plate. The transport method includes a controlling step for controlling the elevating portion based on measurement results of each of the one or more load sensors.

The present disclosure can provide a transport system and a transport method that facilitate adjusting the height of an object to the position of guide rails provided on a rack.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, the present disclosure will be described through an embodiment of the disclosure, but the disclosure according to the scope of the claims is not limited to the following embodiment. Moreover, not all of the configurations described in the embodiment are indispensable as means for solving the problem.

A transport system according to the embodiment will be described with reference to the drawings. The transport system according to the embodiment is a system in which a transport robot transports an object. The transport robot stores the object in a rack.

The transport system may be provided with a server that controls autonomous movement of the transport robot, but the transport robot may generate a transport route by itself to perform the autonomous movement. A system in which the processing is completed within the transport robot that does not include a server can also be included in the transport system according to the embodiment.

Figure 1:
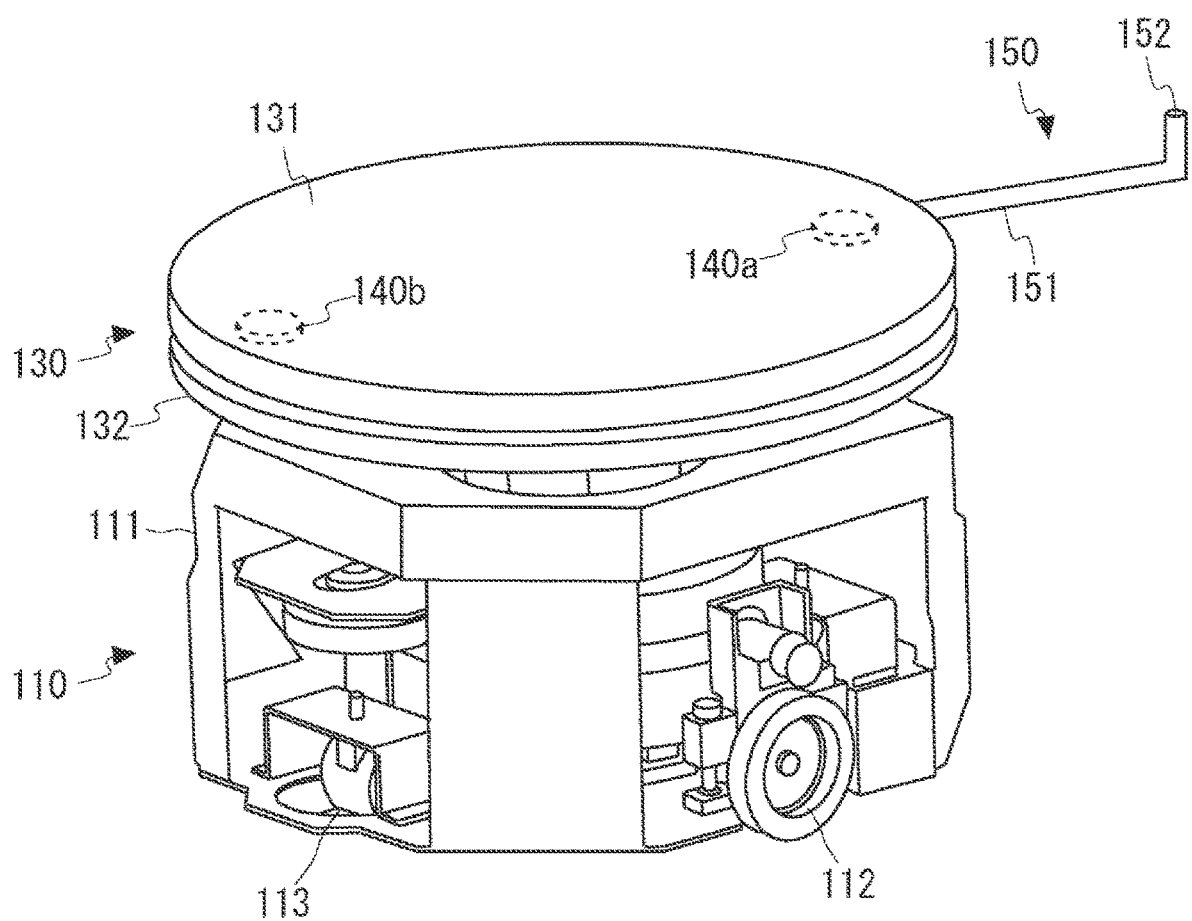
FIG. 1 is a perspective view showing a configuration of a transport robot according to an embodiment.
Figure 2:
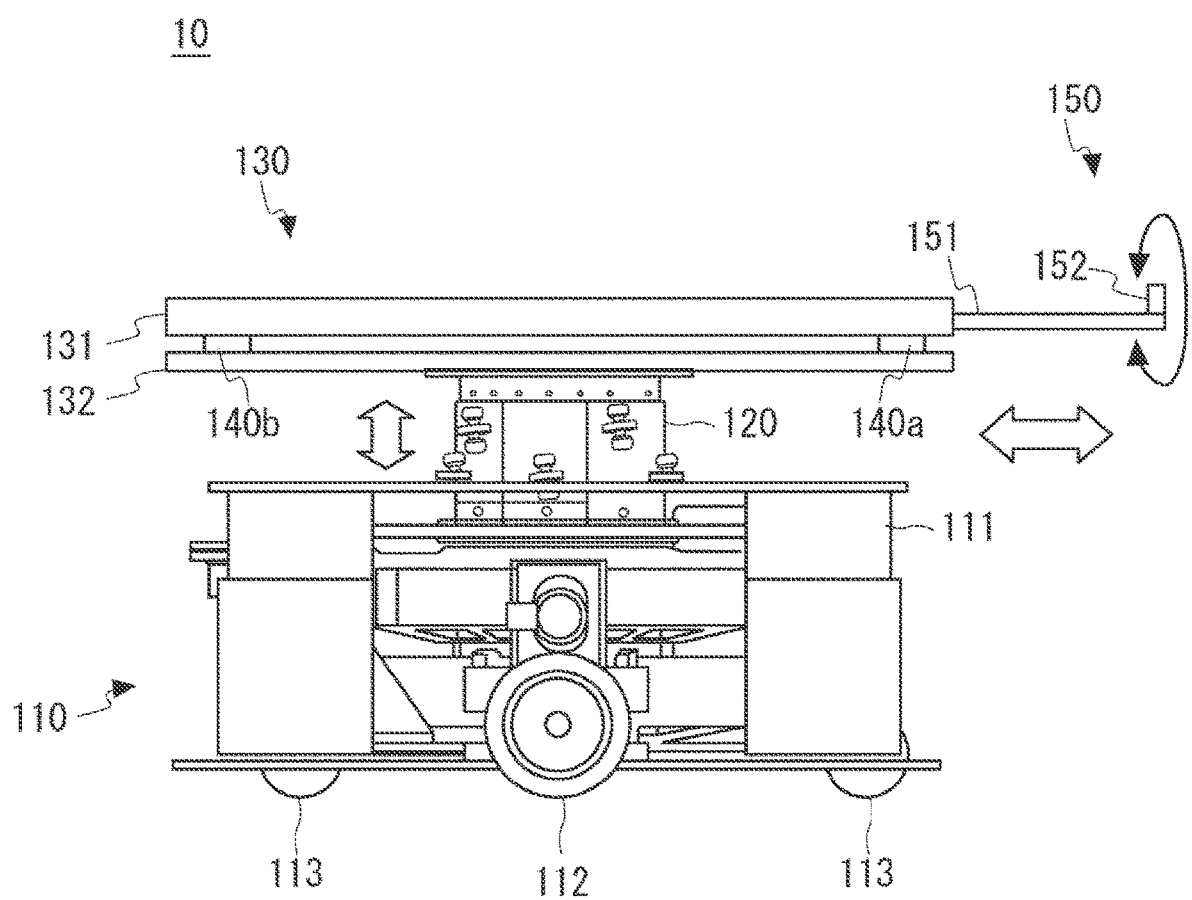
FIG. 2 is a side view showing a configuration of the transport robot according to the embodiment.
Figure 3:
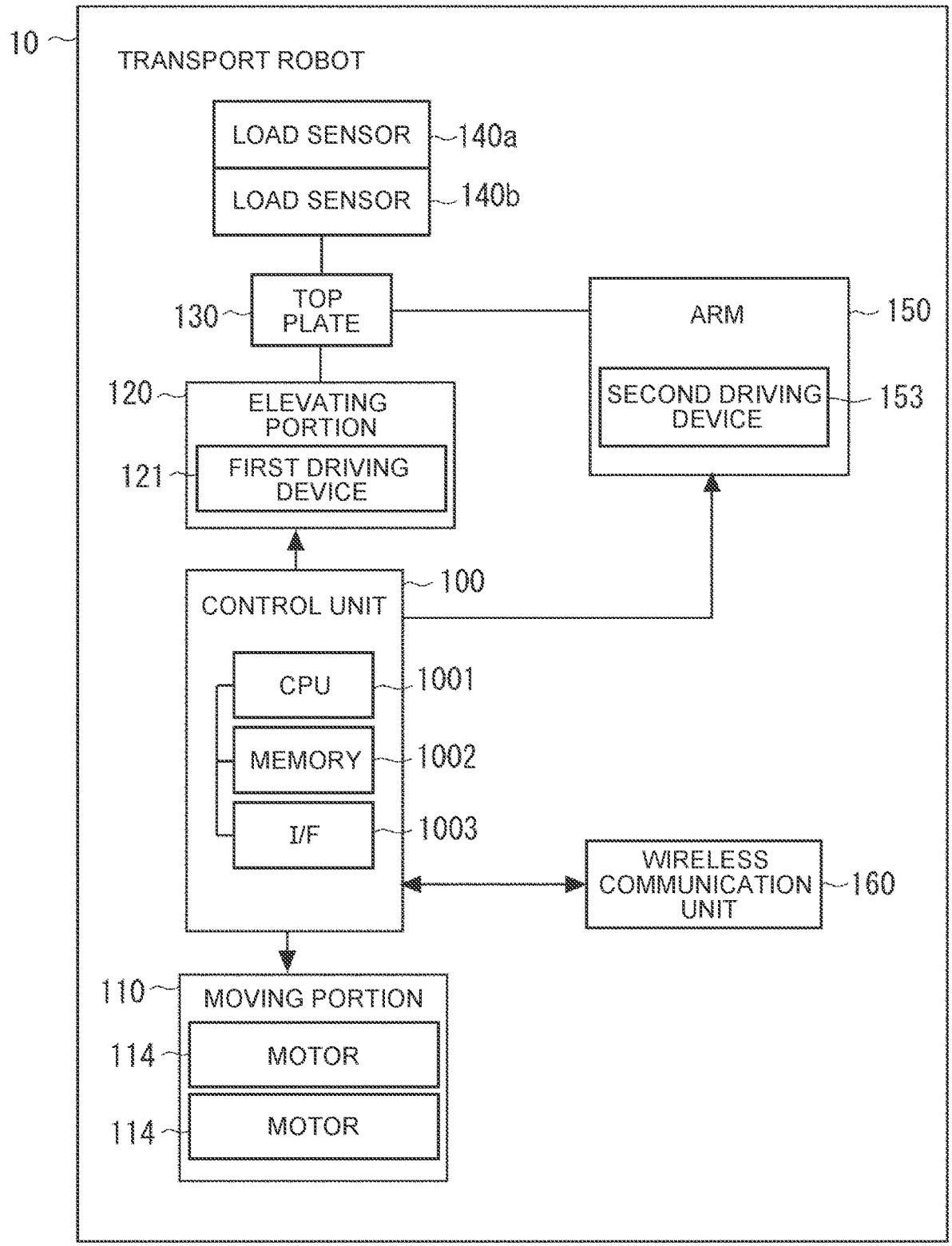
FIG. 3 is a block diagram showing functions of the transport robot according to the embodiment.

FIG. 1 is a perspective view showing a schematic configuration of a transport robot 10 included in the transport system according to the embodiment. FIG. 2 is a schematic side view showing the schematic configuration of the transport robot 10. FIG. 3 is a block diagram showing a schematic system configuration of the transport robot 10.

The transport robot 10 includes a movable moving portion 110, an elevating portion 120, a top plate 130 for supporting a placed object, load sensors 140a and 140b, an arm 150, a control unit 100, and a wireless communication unit 160. The control unit 100 controls the transport robot 10 including the control of the moving portion 110, the elevating portion 120, and the arm 150. Hereinafter, when the load sensors 140a and 140b are not distinguished from each other, they may be referred to as a load sensor 140. The number of load sensors 140 does not have to be two, and may be one.

The moving portion 110 includes a robot body 111, a pair of right and left drive wheels 112 and a pair of front and rear driven wheels 113 that are rotatably provided on the robot body 111, and a pair of motors 114 that rotates and drives the respective drive wheels 112. Each motor 114 rotates the corresponding drive wheel 112 via a speed reducer or the like. Each motor 114 rotates the corresponding drive wheel 112 in accordance with a control signal from the control unit 100, thereby enabling forward movement, backward movement, and rotation of the robot body 111. With this configuration, the robot body 111 can move to a given position. Note that, the configuration of the moving portion 110 is an example, and the present disclosure is not limited to this. For example, the number of the drive wheels 112 and the driven wheels 113 of the moving portion 110 may be any number, and any configuration can be applied as long as the robot body 111 can be moved to a given position.

The elevating portion 120 is a telescopic mechanism that expands and contracts in the vertical direction. The elevating portion 120 is also referred to as a telescopic portion. The elevating portion 120 may be configured as a telescopic-type expansion and contraction mechanism. The top plate 130 is provided at the upper end of the elevating portion 120, and the top plate 130 is raised or lowered by the operation of the elevating portion 120. The elevating portion 120 includes a first driving device 121 such as a motor, and expands and contracts as the first driving device 121 is driven. That is, the top plate 130 is raised or lowered as the first driving device 121 is driven. The first driving device 121 is driven in response to a control signal from the control unit 100. Note that, in the transport robot 10, any known mechanism for controlling the height of the top plate 130 provided on the upper side of the robot body 111 may be used instead of the elevating portion 120.

The top plate 130 is provided on the upper portion (tip) of the elevating portion 120. The top plate 130 is raised and lowered by the driving device such as a motor. In the embodiment, the top plate 130 is used for placing the object to be transported by the transport robot 10. For transportation, the transport robot 10 moves together with the object while the object is supported by the top plate 130. As a result, the transport robot 10 transports the object.

The top plate 130 is composed of, for example, an upper member 131 and a lower member 132. The lower member 132 is attached to the upper end of the elevating portion 120. The upper member 131 has a placing surface on which the object is placed.

Further, the top plate 130 may have a space for accommodating the arm 150 described later. The arm 150 described later may be accommodated inside the upper member 131, for example. The shape of the top plate 130 is, for example, a flat disk shape, but any other shape may be used. For example, the top plate 130 may be provided with a notch so as not to interfere with the arm 150.

The load sensors 140a and 140b are provided, for example, between the upper member 131 and the lower member 132, and measure the load at the provided positions. For example, the load sensor 140a may be provided on the front side of the top plate 130, and the load sensor 140b may be provided on the rear side of the top plate 130. At this time, the load sensor 140a measures the load applied to the front side of the top plate 130, and the load sensor 140b measures the load applied to the rear side of the top plate 130. Here, the front side and the rear side are the front side and the rear side in the direction of storing the object. Therefore, the front side of the top plate 130 may be referred to as a rack 80 side described later. Further, the front side of the top plate 130 may be referred to as the side on which the arm 150 described later expands. The load sensors 140a and 140b may be, for example, load cells.

The positions where the load sensors 140a and 140b are disposed are not limited to the positions between the upper member 131 and the lower member 132. For example, thin load sensors 140a and 140b may be disposed on the placing surface of the top plate 130.

Further, the transport robot 10 does not need to include both the load sensors 140a and 140b, and may include only one of them. Further, the position where the load sensor 140 is provided may be any position, and is not limited to the front side or the rear side of the top plate 130 described above.

The arm 150 that expands and contracts in the horizontal direction is provided on the top plate 130. The arm 150 is an arm for moving the object in and out of the rack 80 described later. The arm 150 has a shaft portion 151 that can be expanded and contracted along the axis, and a protruding portion 152. The protruding portion 152 extends in a direction different from that of the shaft portion 151 and engages with a groove provided on the bottom surface of the object. The protruding portion 152 may extend from the tip of the shaft portion 151 in the direction perpendicular to the shaft portion 151. That is, the arm 150 may have an L-shape. The shape of the tip of the arm 150 is not limited to the hook shape, and may be a shape that sandwiches the object.

The arm 150 includes a second driving device 153 that expands and contracts the arm 150 in the horizontal direction (that is, the direction along the shaft portion 151, in other words, the longitudinal direction of the arm 150). The second driving device 153 may further have a function of rotating the arm 150 with the shaft portion 151 as a rotation axis. The second driving device 153 may be provided inside the upper member 131 of the top plate 130, for example. The second driving device 153 includes, for example, a motor and a linear guide, and expands and contracts the arm 150 in the horizontal direction. The telescopic mechanism is not limited to a structure using a linear guide, and any known mechanism may be used.

Figure 4:
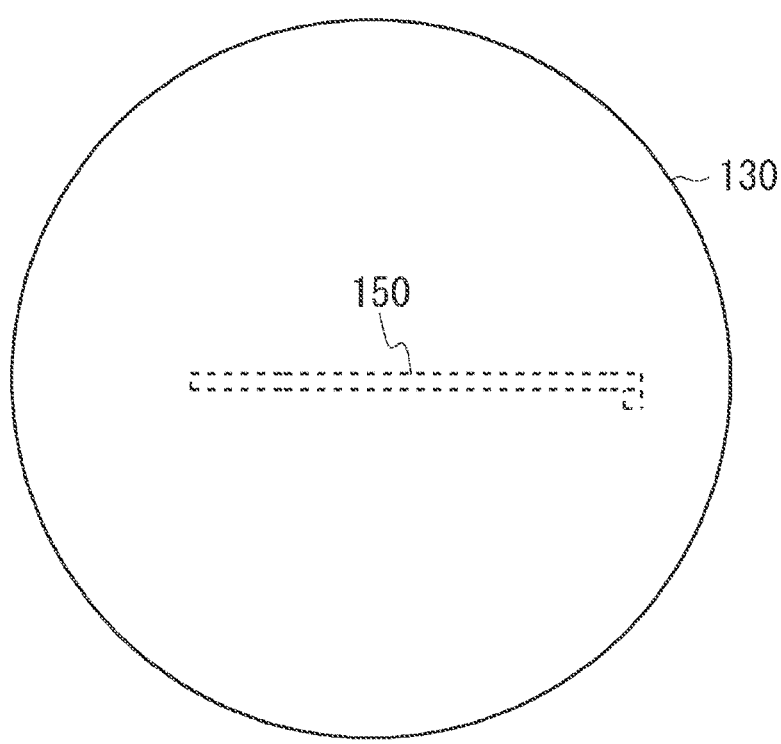
FIG. 4 is a schematic plan view showing a state in which an arm is contracted.
Figure 5:
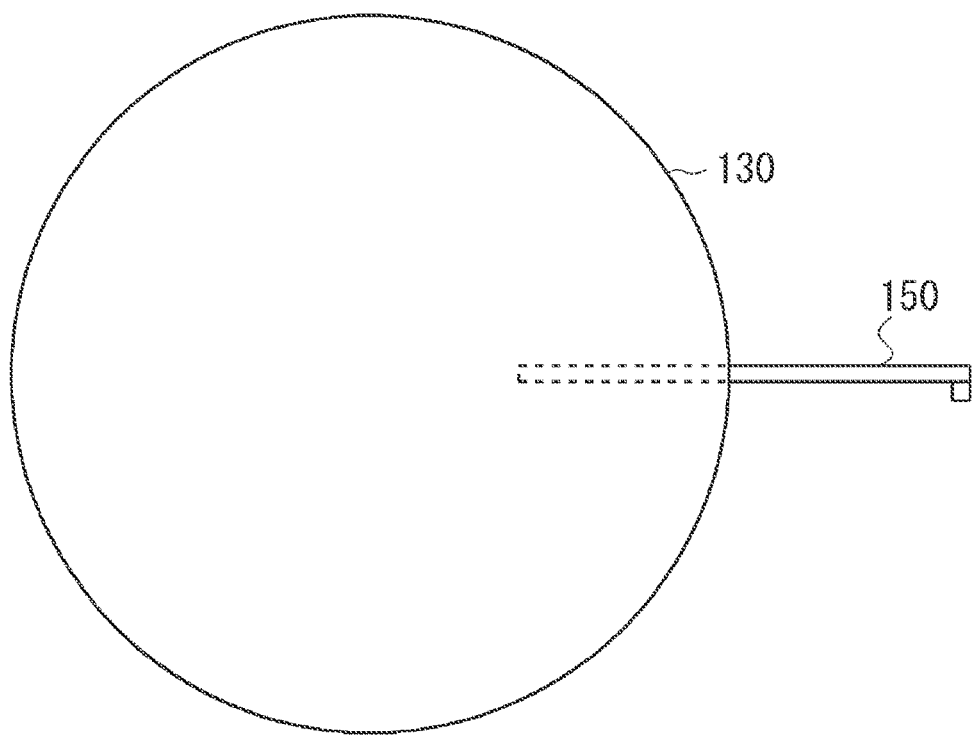
FIG. 5 is a schematic plan view showing a state in which the arm is expanded.
Figure 6:
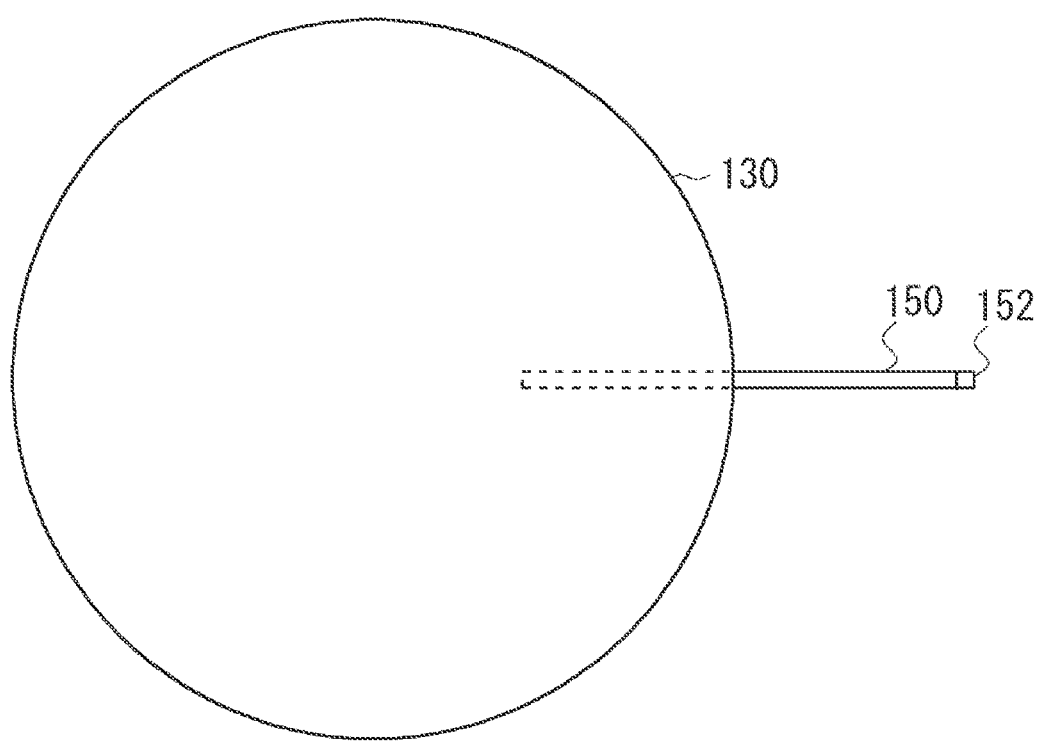
FIG. 6 is a schematic plan view showing a state in which the arm is expanded and then a protruding portion is directed upward.

Here, the expansion and contraction of the arm 150 are shown in FIGS. 4 to 6. FIG. 4 is a schematic plan view showing a state in which the transport robot 10 contracts the arm 150. FIG. 5 is a schematic plan view showing a state in which the transport robot 10 expands the arm 150. FIG. 6 is a schematic plan view showing a state in which the transport robot 10 expands the arm 150 and the protruding portion 152 faces upward.

The wireless communication unit 160 is a circuit for performing wireless communication to communicate with a server or another robot as needed, and includes, for example, a wireless transmission and reception circuit and an antenna. Note that, when the transport robot 10 does not communicate with other devices, the wireless communication unit 160 may be omitted.

The control unit 100 is a device that controls the transport robot 10, and includes a processor 1001, a memory 1002, and an interface (IF) 1003. The processor 1001, the memory 1002, and the interface 1003 are connected to each other via a data bus or the like.

The interface 1003 is an input and output circuit used for communicating with other devices such as the moving portion 110, the elevating portion 120, the arm 150, and the wireless communication unit 160.

The memory 1002 is composed of, for example, a combination of a volatile memory and a non-volatile memory. The memory is used to store software (computer program) including one or more commands to be executed by the processor, data used for executing various processes of the transport robot, and the like.

The processor 1001 may be, for example, a microprocessor, a microprocessor unit (MPU), or a central processing unit (CPU). The processor 1001 may include a plurality of processors. As described above, the control unit 100 is a device that functions as a computer.

The above-mentioned program can be stored using various types of non-transitory computer-readable media and supplied to a computer. The non-transitory computer-readable media include various types of tangible recording media. Examples of the non-transitory computer-readable media include magnetic recording media (e.g. flexible disks, magnetic tapes, hard disk drives), magneto-optical recording media (e.g. magneto-optical disks), compact disc read-only memory (CD-ROM), compact disc recordable (CD-R), compact disc rewritable (CD-R/W), and semiconductor memory (e.g. mask ROM, programmable ROM (PROM), erasable PROM (EPROM), flash ROM, random access memory (RAM)). Further, the program may be supplied to the computer using various types of transitory computer-readable media. Examples of the transitory computer-readable media include electrical signals, optical signals, and electromagnetic waves. The transitory computer-readable media can supply the program to the computer via a wired communication path such as an electric wire and an optical fiber, or a wireless communication path.

Next, the processes of the control unit 100 will be described. The control unit 100 can control the rotation of each drive wheel 112 and move the robot body 111 to a given position by transmitting the control signal to each motor 114 of the moving portion 110.

Note that, the control unit 100 may control movement of the transport robot 10 by executing known control such as feedback control or robust control based on rotation information of the drive wheels 112 detected by rotation sensors provided on the drive wheels 112. Further, the control unit 100 may cause the transport robot 10 to move autonomously by controlling the moving portion 110 based on distance information detected by a distance sensor such as a camera or an ultrasonic sensor provided on the transport robot 10 and map information on moving environment.

The control unit 100 can control the expansion and contraction of the arm 150 in the horizontal direction and the orientation of the protruding portion 152 by transmitting the control signal to the second driving device 153.

The control unit 100 can control the height of the top plate 130 by transmitting the control signal to the first driving device 121 of the elevating portion 120. Here, the control unit 100 acquires measurement results from the load sensors 140a and 140b, and controls the height of the top plate 130 (that is, the length of the elevating portion 120) based on the measurement results. Details of the method of adjusting the height of the top plate 130 will be described later.

Figure 7:
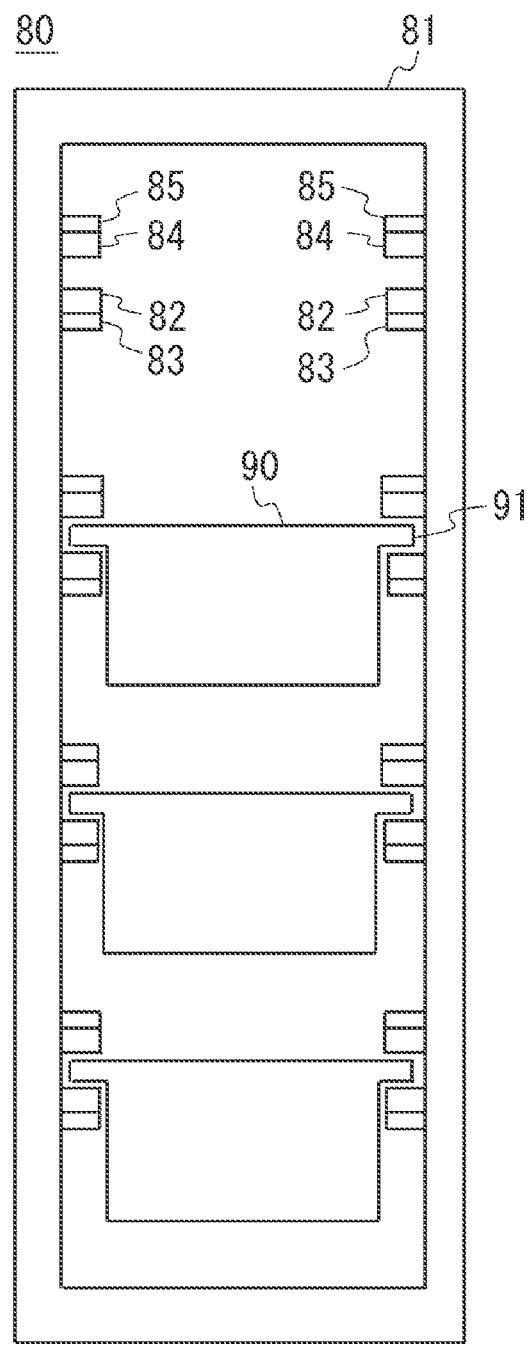
FIG. 7 is a schematic front view showing a configuration of a rack according to the embodiment.
Figure 8:
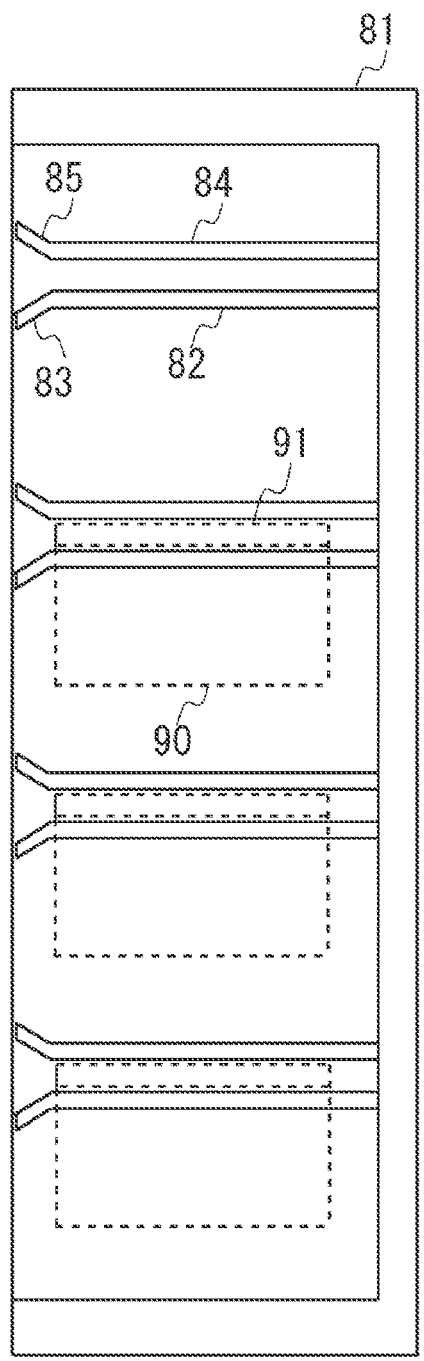
FIG. 8 is a schematic side view showing the configuration of the rack according to the embodiment.
Figure 9:
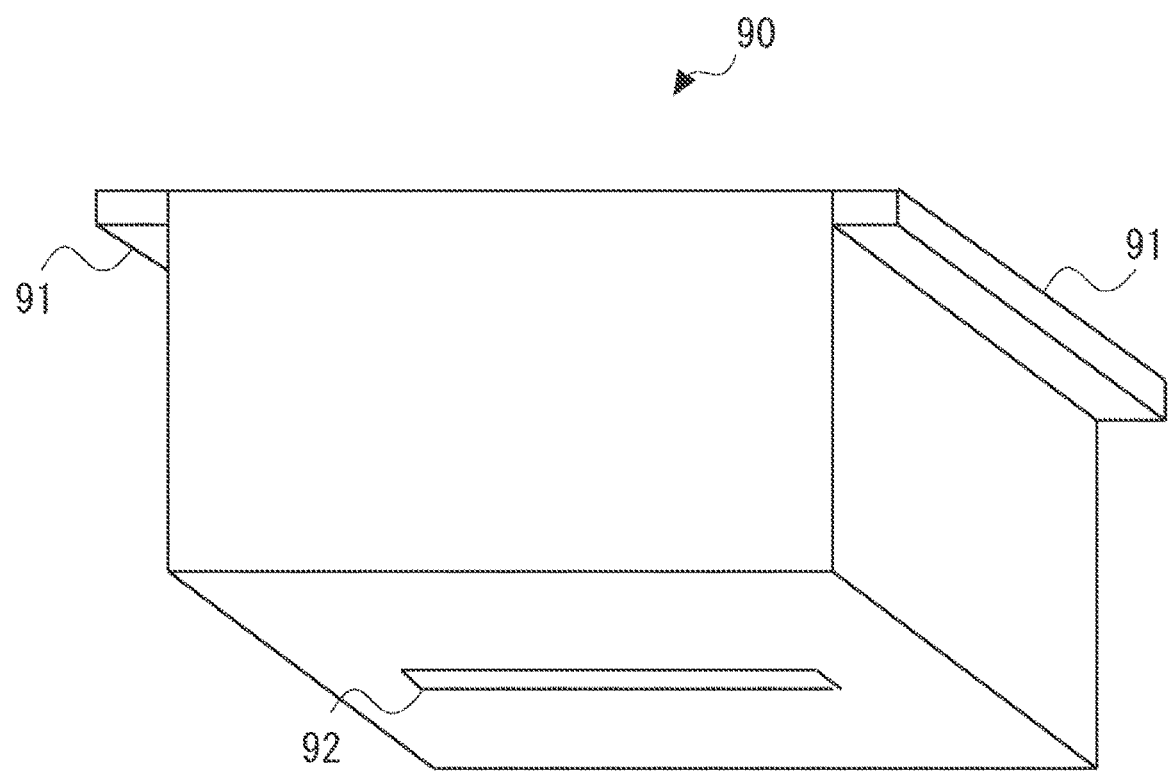
FIG. 9 is a perspective view showing a configuration of an object according to the embodiment.

Next, the rack included in the transport system according to the embodiment and the object to be transported will be described. FIG. 7 is a schematic front view and FIG. 8 is a schematic side view, each showing the rack 80 and an object 90 accommodated in the rack 80. FIG. 9 is a perspective view showing the front surface, the bottom surface, and the side surface of the object 90.

The object 90 includes protrusions 91 that protrude in the width direction. The protrusions 91 may be the brim of the object 90. The protrusions 91 are provided on the respective sides of the object 90 from the front surface to the back surface. In the example shown in FIG. 9, the protrusions 91 are each provided in an upper portion of the object 90. The protrusions 91 need not be provided in a lower portion, for example, and may not necessarily be provided in the upper portion.

A housing 81 of the rack 80 has, for example, a top plate, a right side plate, a left side plate, a bottom plate, and a back plate. The rack 80 has a pair of first rail portions 82 for supporting the protrusions 91 of the object 90. The pair of the first rail portions 82 extends in the depth direction of the rack 80. The pair of the first rail portions 82 is provided in parallel at the same height. Although four pairs of the first rail portions 82 are provided in FIGS. 7 and 8, the number of the pairs of the first rail portions 82 may be any number. In the object 90, one of the protrusions 91 is supported by one of the pair of the first rail portions 82, and the other of the protrusions 91 is supported by the other of the pair of the first rail portions 82. The pair of the first rail portions 82 is provided from the front surface to the back surface of the rack 80. The rack 80 further includes a pair of first gradient portions 83 extending from the ends of the pair of the first rail portions 82. The pair of the first gradient portions 83 inclines downward toward the front surface of the rack 80.

The rack 80 includes a pair of second rail portions 84 above the pair of the first rail portions 82. The pair of the second rail portions 84 faces the pair of the first rail portions 82. The object 90 is accommodated so that the protrusions 91 are located between the pair of the first rail portions 82 and the pair of the second rail portions 84. A locking mechanism for locking the accommodated object 90 may be mounted on the pair of the second rail portions 84. The rack 80 further includes a pair of second gradient portions 85 extending from the ends of the pair of the second rail portions 84. The pair of the second gradient portions 85 inclines upward toward the front surface of the rack 80. The pair of the first rail portions 82, the pair of the first gradient portions 83, the pair of the second rail portions 84, and the pair of the second gradient portions 85 constitute a guide rail structure of the rack 80.

The rack 80 supports the protrusions 91 provided on both sides of the object 90 from below by the pair of the first rail portions 82. Thereby, the object 90 can move in the front-rear direction in the rack 80 along the pair of the first rail portions 82. That is, the object 90 can be pulled out from the rack 80 by pulling out the object 90 toward the front of the rack 80.

As shown in FIG. 9, a groove 92 for hooking the protruding portion 152 of the arm 150 may be provided on the bottom surface of the object 90 at a predetermined position. The groove 92 may have, for example, a semi-cylindrical shape having an axial direction that coincides with the direction of pulling out the object 90. When the tip of the arm 150 has a shape that sandwiches the object 90, the groove 92 need not be provided in the object 90.

The control unit 100 of the transport robot 10 moves the object 90 from the rack 80 to the top plate 130 or moves the object 90 from the top plate 130 to the rack 80, by operating the arm 150. Hereinafter, a method in which the transport robot 10 pulls out the object 90 from the rack 80 will be described.

For example, the control unit 100 expands the arm 150 by a predetermined length and moves the protruding portion 152 of the arm 150 toward the groove 92 on the bottom surface of the object 90. Here, the protruding portion 152 may be oriented in the horizontal direction. Then, the control unit 100 rotates the protruding portion 152 with the shaft portion 151 of the arm 150 as a rotation axis, and inserts the protruding portion 152 into the groove 92 of the object 90. The control unit 100 may expand the arm 150 with the protruding portion 152 facing upward and then raise the top plate 130 to insert the protruding portion 152 into the groove 92.

Then, the transport robot 10 contracts the arm 150 in a state where the protruding portion 152 of the arm 150 is hooked in the groove 92. As a result, the object 90 is pulled out from the rack 80 and moves to the top plate 130. On the other hand, the control unit 100 expands the arm 150 with the protruding portion 152 in the groove 92 and pushes the object 90 into the rack 80 to store the object 90 on the top plate 130 in the rack 80.

Figure 10:
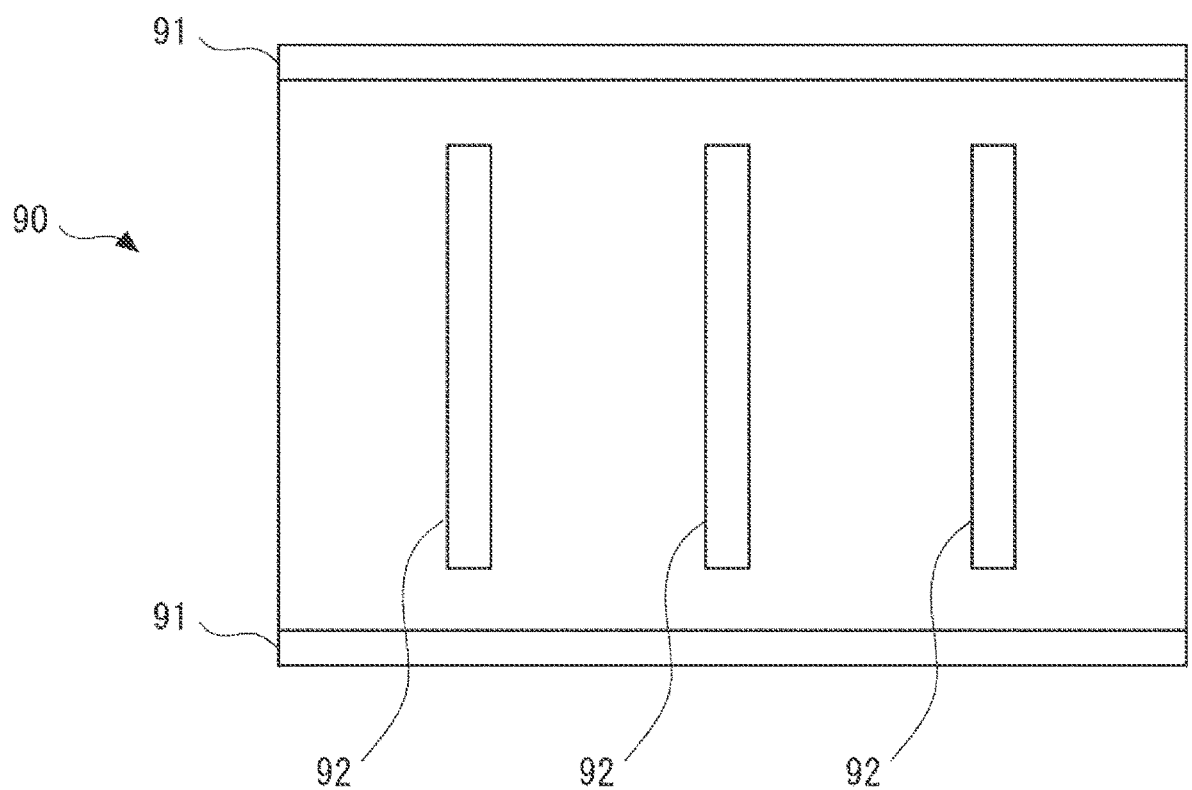
FIG. 10 is a schematic bottom view showing a plurality of grooves of the object.

The number of grooves 92 of the object 90 may be one as shown in FIG. 9, but may be plural as shown in FIG. 10. FIG. 10 is a schematic bottom view of the object 90. Specifically, the object 90 has a plurality of grooves 92 disposed side by side in a perpendicular direction, that is, in a moving direction of the object 90. In this case, when the control unit 100 of the transport robot 10 moves the object 90 accommodated in the rack 80 to the top plate 130, the control unit 100 may hook the tip of the arm 150 in order from the groove 92 on the top plate 130 side, and repeat the pulling-out operation from the rack 80. Similarly, when the control unit 100 of the transport robot 10 moves the object 90 on the top plate 130 to the rack 80, the control unit 100 may hook the tip of the arm 150 in order from the groove 92 on the rack 80 side, and repeat the pushing-in operation to the rack 80.

Next, a method in which the control unit 100 of the transport robot 10 controls the elevating portion 120 based on the measurement results of the load sensors 140a and 140b will be described. It is assumed that the transport robot 10 has moved to the front of the rack 80 with the object 90 placed on the top plate 130. First, the transport robot 10 raises the top plate 130 to a target height. The target height may be set to a height between the height of the upper ends of the pair of the first rail portions 82 and the height of the lower ends of the pair of the second rail portions 84.

Next, the transport robot 10 expands the arm 150 with the protruding portion 152 hooked in the object 90 on the top plate 130. Here, when the top plate 130 is controlled to the height described above, the transport robot 10 can store the object 90 in the rack 80 by expanding the arm 150. On the other hand, when the height of the top plate 130 is higher than the target height, the object 90 may come into contact with the pair of the second gradient portions 85. Further, when the height of the top plate 130 is lower than the target height, the object 90 may come into contact with the first gradient portions 83. In such cases, the transport robot 10 controls the elevating portion 120 based on the measurement results of the load sensors 140a and 140b to adjust the height of the top plate 130.

Figure 11:
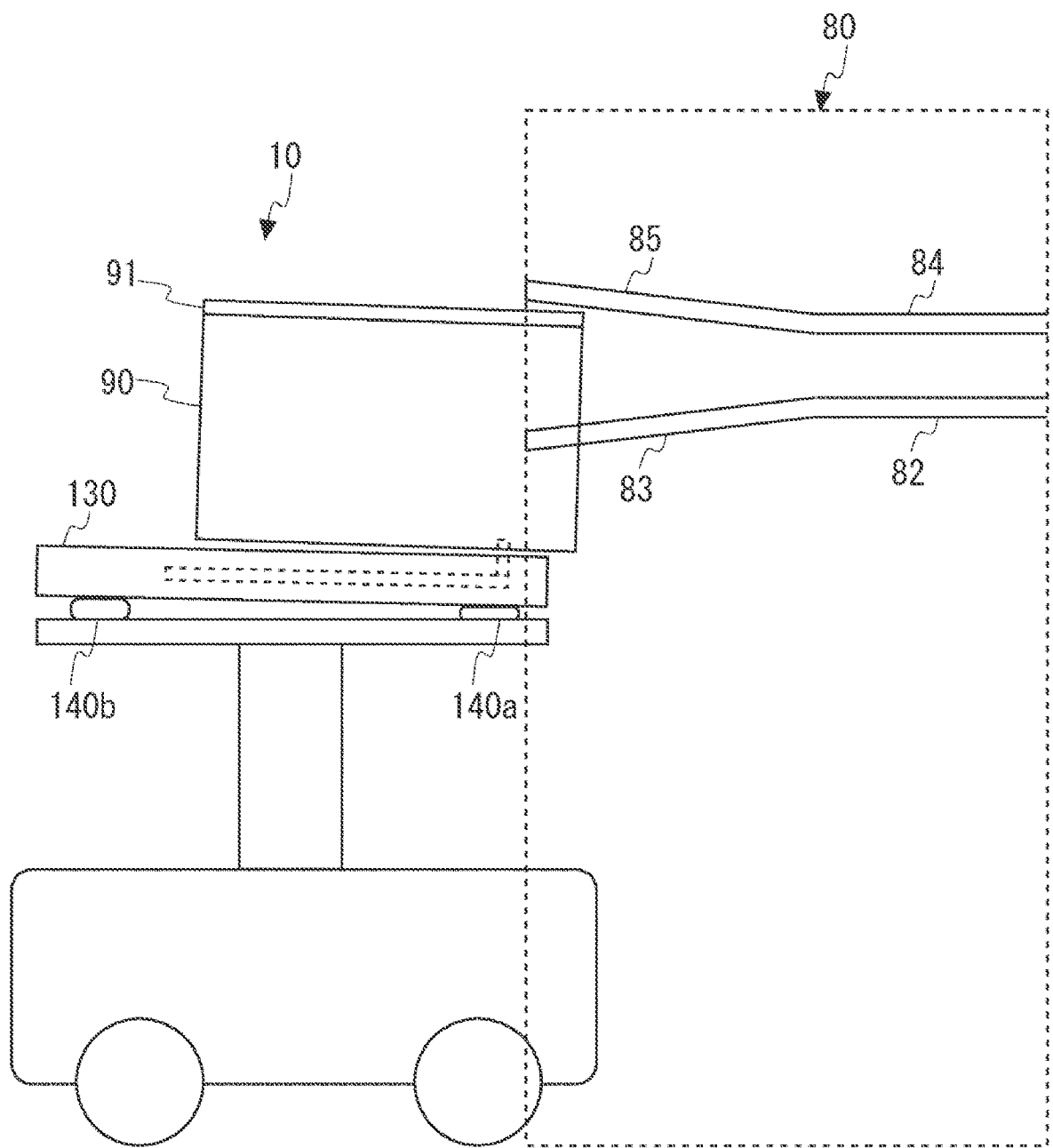
FIG. 11 is a schematic side view showing a state in which the object according to the embodiment is in contact with a pair of second gradient portions.

A method of controlling the height of the top plate 130 will be described with reference to FIGS. 11 and 12. FIG. 11 is a schematic side view showing a state in which the object 90 is in contact with the pair of the second gradient portions 85. In such a case, the object 90 tilts downward toward the rack 80 side. Therefore, the load measured by the load sensor 140a increases and the load measured by the load sensor 140b decreases.

Figure 12:
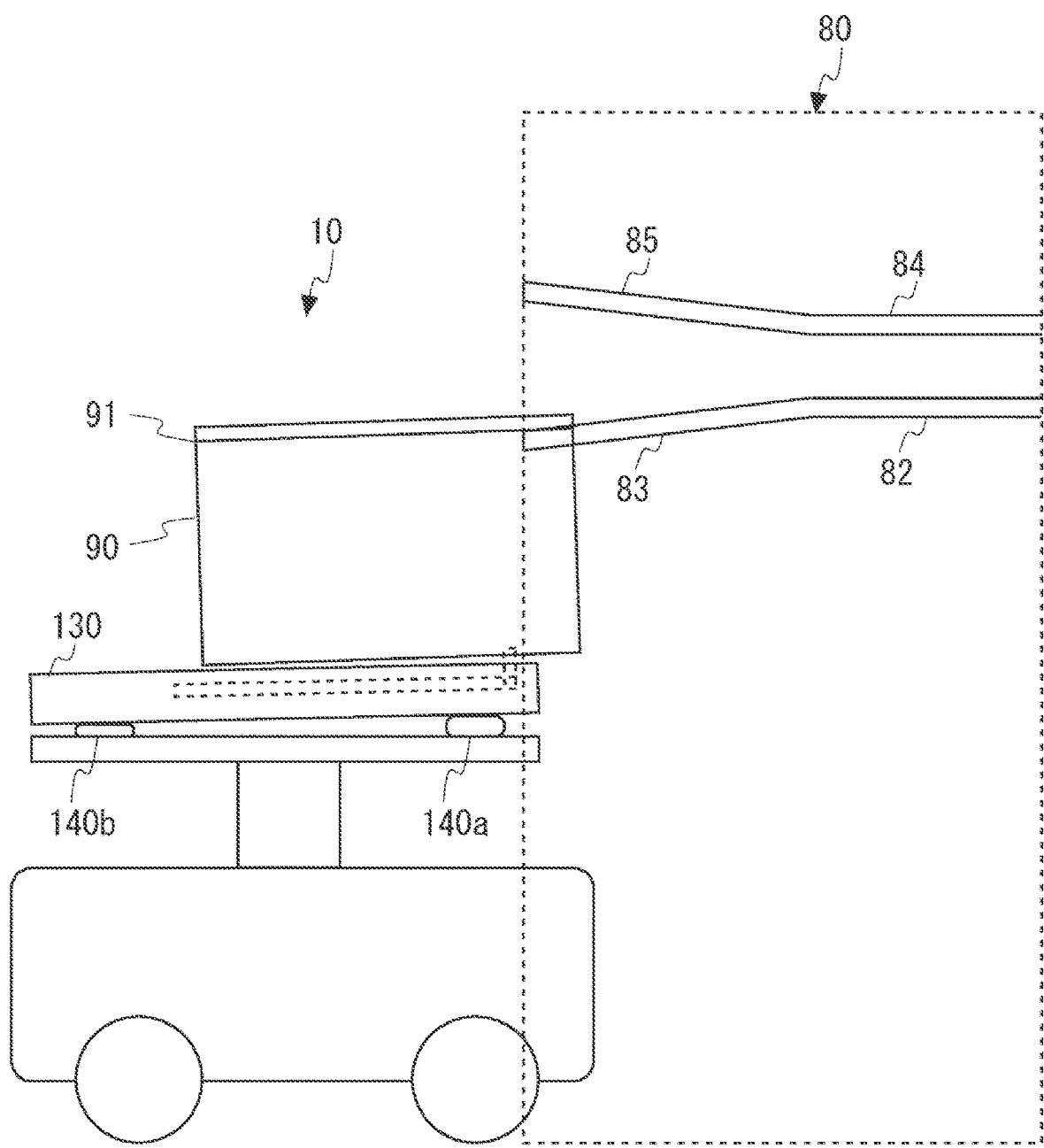
FIG. 12 is a schematic side view showing a state in which the object according to the embodiment is in contact with a pair of first gradient portions.

On the other hand, FIG. 12 is a schematic side view showing a state in which the object 90 is in contact with the pair of the first gradient portions 83. In such a case, the object 90 tilts upward toward the rack 80 side. Therefore, the load measured by the load sensor 140a decreases, and the load measured by the load sensor 140b increases.

When the height of the top plate 130 is lowered from the state of FIG. 11, the inclination of the object 90 becomes smaller, and the measurement result of the load sensor 140a and the measurement result of the load sensor 140b change according to the inclination of the object 90. When the protrusions 91 of the object 90 no longer come into contact with the pair of the second gradient portions 85, the inclination of the object 90 becomes zero.

When the height of the top plate 130 is further lowered, the protrusions 91 of the object 90 come into contact with the pair of the first gradient portions 83. Then, as shown in FIG. 12, the object 90 begins to tilt in the direction opposite to that in FIG. 11. When the height of the top plate 130 is further lowered, the inclination of the object 90 becomes larger, and the measurement result of the load sensor 140a and the measurement result of the load sensor 140b change according to the inclination of the object 90.

That is, when the height of the top plate 130 is changed from the state shown in FIG. 11 or the state shown in FIG. 12, the inclination angle of the object 90 changes. The measurement result of the load sensor 140a and the measurement result of the load sensor 140b change according to the change in the inclination angle of the object 90. Therefore, the control unit 100 of the transport robot 10 can perform feedback control for the height of the top plate 130 based on the measurement results of the load sensors 140a and 140b, respectively.

The control unit 100 can perform feedback control for the elevating portion 120 based on the difference between the measurement results of the two load sensors 140a and 140b. For example, the control unit 100 may calculate the difference between the load measured by the load sensor 140a and the load measured by the load sensor 140b, and perform feedback control for the height of the top plate 130 so that the difference becomes zero. The control unit 100 can also perform feedback control so that the load measured by either the load sensor 140a or the load sensor 140b becomes the target value. Therefore, as described above, the transport robot 10 only needs to include one of the load sensors 140a and 140b.

Figure 13:
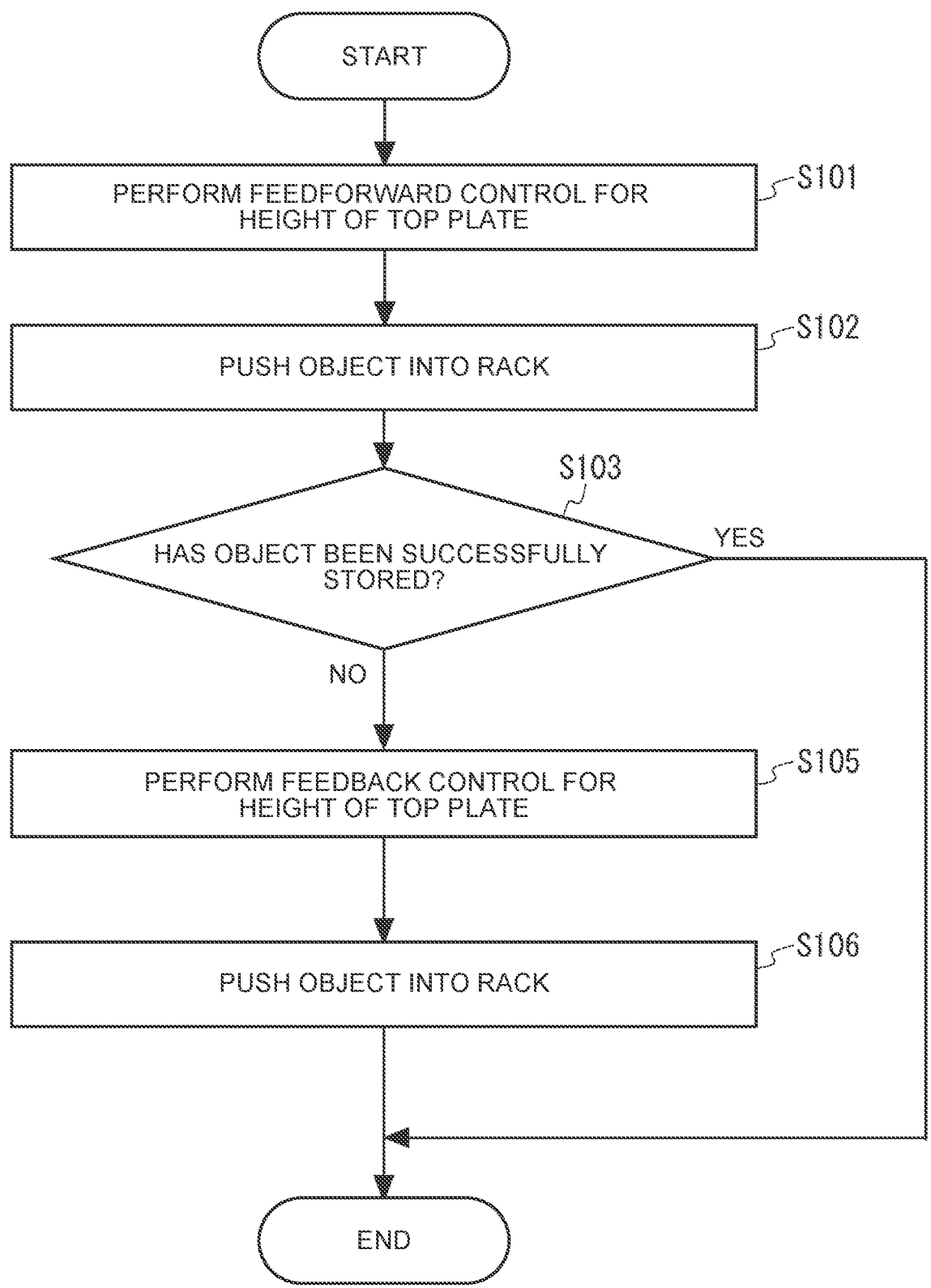
FIG. 13 is a flowchart illustrating a flow of a transport method according to the embodiment.

FIG. 13 is a flowchart showing a flow of a transport method according to the embodiment. It is assumed that the object 90 is placed on the top plate 130 and the transport robot 10 is stopped in front of the rack 80. First, the control unit 100 controls the elevating portion 120 to perform feedforward control so that the height of the top plate 130 becomes a target value (step S101). Here, there is a possibility that the control unit 100 cannot control the height of the top plate 130 to a height between the height of the pair of the first rail portions 82 and the height of the pair of the second rail portions 84 due to equipment variations or the like.

Next, the control unit 100 of the transport robot 10 pushes the object 90 to which the tip of the arm 150 is engaged into the rack 80 (step S102). Subsequently, the control unit 100 of the transport robot 10 determines whether the object 90 has been successfully stored (step S103). For example, the control unit 100 of the transport robot 10 may determine whether the object 90 was able to be stored in the rack 80 based on the detection results of the load sensor 140 and other sensors. Further, the control unit 100 may determine whether the object 90 was able to be stored in the rack 80 based on the length of the expanded arm 150.

When the object 90 was able to be stored in the rack 80 (Yes in step S103), the control unit 100 ends the process. On the other hand, when the object 90 was not able to be stored in the rack 80 (No in step S103), the control unit 100 controls the elevating portion 120 based on the measurement results of each of the load sensors 140a and 140b to perform feedback control for the height of the top plate 130 (step S105). In the case of FIG. 11, the control unit 100 lowers the top plate 130 according to the measurement results of the load sensors 140a and 140b. In the case of FIG. 12, the control unit 100 raises the top plate 130 according to the measurement results of the load sensors 140a and 140b.

After controlling the height of the top plate 130, the control unit 100 further expands the arm 150 and pushes the object 90 into the rack 80 (step S106). When the object 90 was not able to be stored in the rack 80 in step S106, the control unit 100 may perform feedback control in step S105 again.

Finally, the effects of the transport system according to the embodiment will be described in detail. When storing an object in a rack equipped with guide rails, it may be difficult to control the height only by feedforward control. When the first gradient portions and the second gradient portions come into contact with the object, the transport robot according to the embodiment can control the height of the top plate according to the inclination of the object. Therefore, the transport system according to the embodiment can facilitate adjusting the height of the object to the position of the guide rails.

The present disclosure is not limited to the above embodiment, and can be appropriately modified without departing from the spirit.

What is claimed is:

1. A transport system in which an object is stored in a rack by a transport robot, wherein:
   the object includes protrusions protruding outward in a width direction;
   the rack includes
      a pair of first rail portions extending in a depth direction for supporting the protrusions,
      a pair of first gradient portions extending from ends of the pair of the first rail portions and inclining downward toward a front surface of the rack,
      a pair of second rail portions provided above the pair of the first rail portions so as to face the pair of the first rail portions, and
      a pair of second gradient portions extending from ends of the pair of the second rail portions and inclining upward toward the front surface of the rack; and
   the transport robot includes
      a top plate on which the object is placed,
      an elevating portion that raises and lowers the top plate,
      one or more load sensors provided on the top plate, and
      a controller for controlling the elevating portion based on measurement results of each of the one or more load sensors; wherein:
   the transport robot further includes an arm provided on the top plate for moving the object in and out of the rack; and
   the controller
      pushes the object into the rack using the arm, after controlling the elevating portion by feedforward control, and
      performs feedback control for the elevating portion based on the measurement results of each of the one or more load sensors, when the object failed to be stored in the rack.

2. The transport system according to claim 1, wherein:
   the transport robot includes two load sensors as the one or more load sensors;
   one of the two load sensors is provided on a front side of the top plate, and the other of the two load sensors is provided on a rear side of the top plate; and
   the controller controls the elevating portion based on a difference between measurement results of the two load sensors.

3. The transport system according to claim 1, wherein each of the one or more load sensors is a load cell.

4. A transport method in which an object is stored in a rack by a transport robot, wherein:
   the object includes protrusions protruding outward in a width direction;
   the rack includes
      a pair of first rail portions extending in a depth direction for supporting the protrusions,
      a pair of first gradient portions extending from ends of the pair of the first rail portions and inclining downward toward a front surface of the rack,
      a pair of second rail portions provided above the pair of the first rail portions so as to face the pair of the first rail portions, and
      a pair of second gradient portions extending from ends of the pair of the second rail portions and inclining upward toward the front surface of the rack;
   the transport robot includes
      a top plate on which the object is placed,
      an elevating portion that raises and lowers the top plate, and
      one or more load sensors provided on the top plate; and
   the transport method includes a controlling step for controlling the elevating portion based on measurement results of each of the one or more load sensors; wherein:
   the transport robot further includes an arm provided on the top plate for moving the object in and out of the rack; and
   a controller that
      pushes the object into the rack using the arm, after controlling the elevating portion by feedforward control, and
      performs feedback control for the elevating portion based on the measurement results of each of the one or more load sensors, when the object failed to be stored in the rack.

5. The transport method according to claim 4, wherein:
   the transport robot includes two load sensors as the one or more load sensors;
   one of the two load sensors is provided on a front side of the top plate, and the other of the two load sensors is provided on a rear side of the top plate; and the controlling step controls the elevating portion based on a difference between detection results of the two load sensors.

\* \* \* \* \*